United States Patent
Robinson

[11] 3,877,790
[45] Apr. 15, 1975

[54] LARGE LIQUID CRYSTAL DISPLAYS AND METHOD OF PRODUCING THEM

[75] Inventor: Thomas L. Robinson, East Aurora, N.Y.

[73] Assignee: Astronics Corporation, Buffalo, N.Y.

[22] Filed: Sept. 18, 1972

[21] Appl. No.: 289,860

[52] U.S. Cl. .......................................... 350/160 LC
[51] Int. Cl. .............................................. G02f 1/28
[58] Field of Search ............................. 350/160 LC

[56] References Cited
UNITED STATES PATENTS

| | | | |
|---|---|---|---|
| 3,600,060 | 8/1971 | Churchill | 350/160 LC |
| 3,645,604 | 2/1972 | Ngo | 350/160 LC |
| 3,730,607 | 5/1973 | Grabmaier et al. | 350/160 LC |

OTHER PUBLICATIONS
"Liquid Crystals: Those New Electronic Show OFFS" by R. M. Bienret, Popular Sci. Feb. 1972 pp. 78, 79, 146.

*Primary Examiner*—Ronald L. Wibert
*Assistant Examiner*—Paul K. Godwin
*Attorney, Agent, or Firm*—Schlesinger, Fitzsimmons & Schlesinger

[57] ABSTRACT

Displays having large areas are produced by using a screen whose interstices contain a liquid crystalline substance, such as Nematic Liquid Crystals. The screen is used to control the thickness and shape of the NLC material film over larger areas. The screen may be sandwiched between two electrodes or be coplanar with one or both electrodes, etc.

15 Claims, 25 Drawing Figures

3,877,790

LARGE LIQUID CRYSTAL DISPLAYS AND METHOD OF PRODUCING THEM

The present invention relates to displays, and more particularly to liquid crystal displays, and a method for producing displays of this type having large areas.

It is known that a certain class of thread-like liquid crystal materials known as Nematic Liquid Crystals (NLC) produced from p-Ethoxy-Benzylidene, p-n-Butyl-Aniline, 4-Ethoxy, 4'n-Butyl-Benzylidene-Aniline, p-Methoxy-Benzylidene, p-n-Butyl-Aniline, or from 4-Methoxy, 4'n-Butyl-Benzylidene-Aniline, such as manufactured, among others by the Vari-Light Corporation of Cincinnati, Ohio, can be made to function as a type of light valve, or as a light reflector because of electromagnetic radiation. This is accomplished by applying an electric field in the vicinity of the NLC material. The effect of an electrostatic field upon NLC causes molecules of the material to become disordered, or turbulent, much like vigorously boiling water in a shallow pan, thereby preventing a large portion of incident radiation from being transmitted through it, as well as back-scattering the illumination.

NLC material exists in three distinct states:
1. At low temperatures it is a solid crystal;
2. At intermediate temperatures it is in the liquid crystal, or "Mesophase" state; and
3. At high temperatures it exhibits the isotropic properties of an ordinary liquid.

NLC material can be compounded to operate in a number of temperature ranges. For instance, the liquid crystal form, sold under the designation "MBBA", becomes a solid crystal below about 10°C, has liquid crystal properties (Mesophase) from 10°C to 48°C; and reverts to ordinary liquid properties (becomes isotropic) above 48°C. In a modification, known as "EBBA", it is a solid crystal at 32°C, is a liquid crystal between 32°C and 81°C; and it has the properties of an ordinary liquid substance above 81°C.

In the useful temperature range (the Mesophase) a thin film of NLC substance is virtually transparent in the absence of an electric field applied across it. However, when a direct current, or a relatively low frequency voltage (60 Hz to 200 Hz) is applied across terminals with electrodes sandwiching the NLC, the thin layer of material turns opalescent due to the induced turbulence which disrupts the crystallinity of the substance. The degree of turbulence is proportional to the strength of the electrostatic field in the NLC material. When excited, light transmission through the NLC material is reduced to a small fraction and incident radiation is also back-scattered. The dynamic scattering of the ambient light results in a frosted white reflection from the display formed by the liquid crystals in the screen.

Since the bulk nematic liquid crystal is cloudy as it appears in its container, it must be applied in very thin films in electro-optical transmissive and reflective devices. In a thin film layer, NLC material is essentially transparent. The thin film cross-section also reduces the voltage required to activate the material.

Known NLC cells are composed of two transparent, flat glass plates, each having a light-transmissive electrical conductor on one face. The NLC material is sandwiched between the conductive faces of the glass plates which are held apart by a thin, narrow, non-conducting spacer or gasket around their perimeters, having a thickness in the range of 0.001, or less (1 mil). The gasket has the advantage that it prevents the NLC material from squeezing out from between the glass plates as well as insulating the conductive coatings from each other.

With prior methods for producing NLC cells, the cells or displays, are limited in size to small areas of a few square inches, such as wristwatch faces, numeric readouts in desk calculators, cockpit panel displays, and the like. Probably this stems from the difficulty and expense of preparing the glass plates to maintain a constant 001 (1 mil) gap between the glass surfaces over a large area.

One object of the present invention is to provide an improved method for fabricating electro-optical, nematic liquid crystal (NLC) devices from a variety of inexpensive, readily available materials.

Another object of the invention is to provide a method for producing very large liquid crystal displays for both indoor and outdoor advertising.

Another object of the invention is to provide certain types of NLC devices in which plastic materials are used throughout.

Another object of the invention is to provide a display of the type described comprising of combination of glass and plastic materials in the form ofo large area devices such as electronic window shades and show windows.

Another object of the invention is to provide a method of manufacturing curved, transmissional NLC panels such as automobile windshields and the like to control sunlight glare.

Another object of the invention is to be able to generate pictures or symbols for both outdoor and indoor advertising.

Still another object of the invention is to provide a conductive, light-transmissive screen for controlling the thickness and shape of the NLC material film over large areas, which may extend up to several square feet.

A still further object of the invention is the achievement of greater contact between the dynamic scattering mode and the quiescent mode by one display cell having two NLC films in cascade, but employing only one set of electrodes.

Other objects of the invention will be apparent hereinafter from the disclosure and from the recital of the appended claims, particularly when read in connection with the accompanying drawings.

Four different electrode structures are disclosed hereinafter, including:
1. The planar structure, defined as an NLC structure where the NLC material occupies the same geometrical plane as that of one of the exciting electrodes, as opposed to the sandwich type NLC cell, where the NLC material is disposed between upper and lower electrodes.
2. The sandwich structure, defined as the structure in which the NLC material is between and in contact with both electrodes through an insulated, transparent screen. This insulating screen is used to determine the thickness of the NLC film and also to insulate the two electrodes from one another.
3. An intermediate structure, where the NLC material touches both electrodes but is not a sandwich structure, because the NLC material is also coplanar with both screen electrodes by virtue of being in the openings or pockets in the screen electrodes.

4. An interdigital (comb-like) structure. Here the NLC material is in the same plane as that of the electrodes. Thus each electrode is also on the same geometrical plane as is the NLC material.

In the drawings:

FIG. 1 is a sectional view illustrating somewhat diagrammatically the principle upon which the present invention is based and showing one embodiment of a display made according to the invention;

FIG. 2 is a sectional view illustrating a display made according to another embodiment of the invention;

FIG. 3 is a sectional view illustrating a further modification of the invention;

FIG. 4 is an exploded sectional view showing one form of transmissive cell made according to this invention;

FIG. 5 is an exploded sectional view illustrating a further modification of the invention;

FIG. 6 is an exploded sectional view illustrating still another modification of the invention, in which the cover plate is a plane glass plate and the substrate is a clear plastic sheet; and the unit may be employed as a substitute for plate glass in a large store window;

FIG. 7 is an exploded sectional view of a further embodiment of the invention such as might be used for the windshield of an automobile;

FIG. 8 is a sectional view of a structure made according to another embodiment of the invention and such as may be used as an inexpensive electronic window shade;

FIG. 9 is a sectional view of a modification of the invention in which the upper and lower substrates are separated by a photoresist insulating screen whose interstices contain the NCL material;

Figure 1:
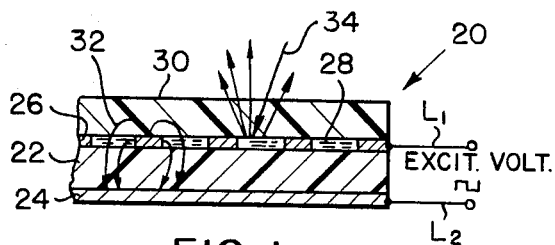
FIGS. 1, 2, 3, 4, 5, 6, 7, 8 and 9 show planar electrode structure.

Referring now to the drawings by numerals of reference, 20 (FIG. 1) denotes generally a reflective cell composed of a thin dielectric film 22 with a solid or opaque conductor 24 on one side and a conductive screen or grid pattern 26 on the other side. NLC material 28 is applied to the screen side and fills the spaces in the conductive grid screen. A clear overlay 30 covers the screen and prevents contamination of the NLC material.

The conductive screen 26 has several functions:
1. It serves as a spacer to maintain a constant thickness of the NLC layer.
2. It acts as a reservoir to enclose the NLC material to keep it from squeezing out of the cell.
3. It forms the NLC display pattern when energized. The electrostatic field pattern depends on the screen geometry.

An alternating current excitation voltage is applied to the cell through the lines $L_1$ and $L_2$, which are connected to the screen and to the solid or opaque back electrode 24, respectively, and which are connected to any suitable source of alternating current.

This FIG. shows diagrammatically how the electrostatic field lines 32 traverse the NLC material 28 causing dynamic scattering of ambient light 34 off the cell's front surface.

In order to be useful as a reflective display, the back electrode 24 must be shaped into some letter, numeral, or other symbolic pattern. When the cell is energized, the NLC material directly above the patterned back electrode will become turbulent, and thus scatter light corresponding to the image of the back electrode, toward the observer looking into the front face of the NLC cell.

The conductive screen can be fabricated on either the bottom side of the clear overlay 30, or on the top side of the dielectric 22.

Figure 2:
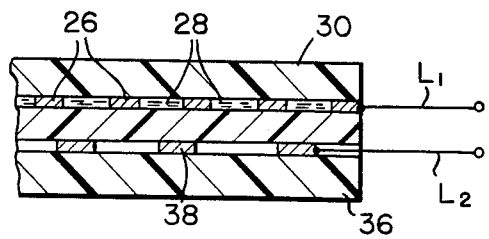
Figure 2A:
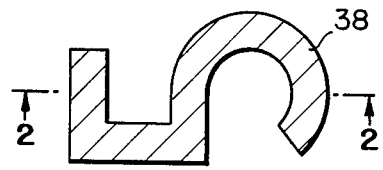
FIG. 2A shows a portion of the circuit board forming part of the display and forming the numeral "5"

FIG. 2 shows a modification of the invention in which a printed circuit board 36 is used as a segmented back electrode. In this FIG., the parts denoted at 38 represent parts on an enlarged scale of the numeral 5 (FIG. 2A), which is printed on the circuit board substrate 36. Such a construction is useful in alpha-numeric readouts for computers and desk calculators. Large dynamic displays can also be built using the NLC structure of this FIG. Here the printed circuit segments constitute the back electrodes. When groups of segments are selectively energized with respect to the upper conductive screen electrode 26, alpha-numeric characters and figures are formed. When the segments are selectively energized only the NLC material directly above the segments becomes turbulent and scatters the ambient light.

Figure 3:
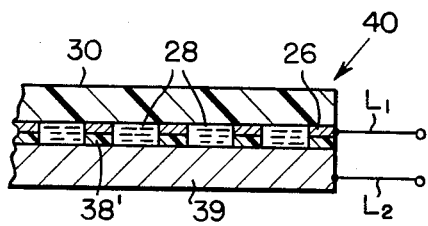

FIG. 3 shows another modification of the invention in which the upper electrode or screen 26 is attached to the clear dielectric overlay 30, and instead of using a thin dielectric film for separating the upper electrode 26 from the lower back electrode 39, the resist material 38' from etching the characters on the circuit board is left on the screen electrode 26 to act as an insulating medium between the upper and lower electrodes 26, 39. The NLC material 28 is applied over and in the screen openings. The cell 40 is completed by pressing the screen against the back electrode 39. The resist material provides the necessary insulation between the back and front electrodes.

An electroformed screen pattern can be substituted for the etched screen. One side then would be coated with a layer of insulating resin. A numeral, letter, or symbol can be produced by shaping the back electrode.

Instead of making the back electrode one solid piece, it may be divided into separate segments to form various alpha-numeric or other characters by selectively energizing segments simultaneously with energization of the upper screen electrode.

In any of the embodiments of the invention shown in FIGS. 1 through 3, the upper electrode may also be formed of closely spaced parallel lines.

Transmissive type NLC cells are illustrated in FIGS. 4 to 11 inclusive. These light transmissive NLC cells will find wide use in devices such as a) electronic window shades; b) automobile sun visors; c) light dimmers; d) signs, both of large and small area, such as billboards, scoreboards, dynamic large screen displays, office calculators, instrument readouts, etc.

Figure 4:
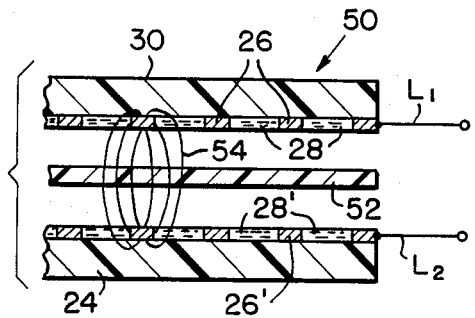

In the cell 50 of FIG. 4, two layers 28, 28' of NLC material work in cascade to develop twice the contrast between the dynamic scattering mode and the quiescent mode. The NLC material is held in the perforations of the foraminous screens 26, 26'. Cells of this type may be used where a high contrast is needed between the "ON" and "OFF" state. Very large area cells are practical with this construction since there is no problem of maintaining constant NLC thickness over the entire surfaces of cells such as are employed in the displays of the present invention.

The front layer 30 of the cell is again a clear upper dielectric substrate or stiffener. A thin dielectric spacer 52 is disposed between the two conductor screens or grids. The lower dielectric substrate 24 is also clear.

FIG. 4 is an exploded view and illustrates diagrammatically the electrostatic flux field 54 between the two conductive screen electrodes 26, 26'.

Figure 5:
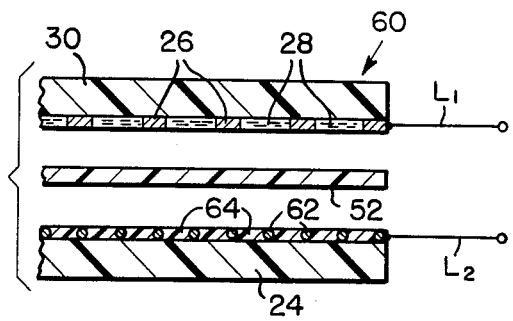

FIG. 5 shows a further modification of the invention. Here the cell 60 has only one layer of NLC material 28 associated with one electrode 26. The other screen electrode 62 is filled with a high dielectric constant, clear material or adhesive 64, such as cyanoethyl suchrose, or a mixture of CES and cyanoethyl starch (HD-27).

The electric behaviour of the high dielectric constant material in between the screen openings is such that the clear dielectric overlay 30, the clear dielectric film spacer 52, and the clear dielectric substrate 24 look like a transparent conductive solid electrode, thus improving the electrostatic field pattern in the NLC material 28 in the upper screen electrode. The NLC crystal cell 60 of FIG. 5 is similar to the cell in FIG. 4 in that the thin dielectric insulating film 52 is removable, and the screen electrodes are attached to the inside surfaces of the upper and lower clear dielectric substrates. The difference lies in the number of NLC layers. In FIG. 4 the two NLC layers are in cascade, one above the other, whereas in FIG. 5 there is only one NLC layer associated with one electrode.

Figure 6:
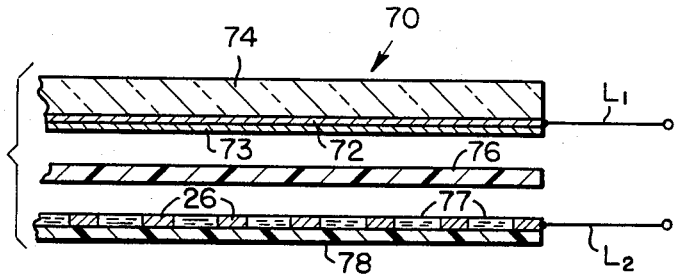
Figure 7:
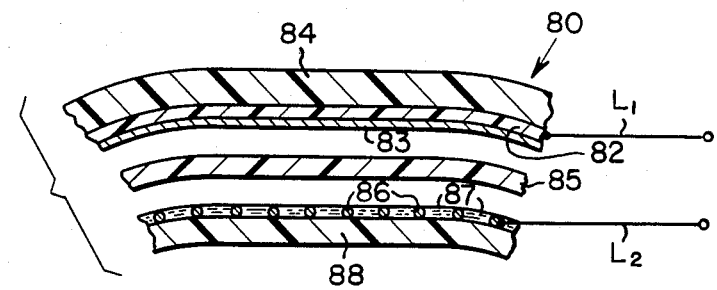

FIGS. 6 and 7 show other types of transmissive NLC cells. Here a glass plate and a plastic sheet are combined. The cell 70 of FIG. 5 is flat. The cell 80 of FIG. 7 is curved.

In FIG. 6 the upper electrode 72 is a conductive transparent layer of gold or tin oxide, or the like, on a glass plate 74, which is commercially available as "NESA" glass. A thin, light-transmissive spacer dielectric film 76 is interposed between the glass plate and a clear plastic substrate 78 containing the lower screen electrode 26. The air gap between the glass and the upper surface of the thin dielectric film spacer 76 is bridged with a thin film of clear adhesive or silicone grease. Instead of the NESA glass a clear plastic substrate with a thin light-transmissive vacuum-deposited conductive coating applied to it may be substituted. Large store-window plate glass can be made having one side conductive with tin oxide. By mating the large conductive glass panel 74 with a clear plastic sheet 78 carrying a screen electrode 26 with NLC material 77 coplanar with the screen openings, a NLC plate glass window can be made. It would be impossible to make such a window with known techniques because of the impossibility of mating two pieces of plate glass so that a NLC film thickness of 0.001 inch, or smaller, could be maintained over the entire area without short-circuiting the electrodes.

FIG. 7 illustrates a curved piece of conductive glass plate 80 such as might be used for a windshield of an automobile. A curved NLC cell can easily be fabricated by inserting a thin transparent spacer dielectric sheet 85 between the conductive glass sheet 84 and a clear plastic substrate 88 carrying a conductive screen 86 with NLC material 87 dispersed in the screen openings. Here again by current, known methods such a curved NLC cell would be impossible, or, at least, very expensive, to construct, since mated curved and ground surfaces would be mandatory for successful cell operation. A curved conductive glass member 84 may be replaced with a clear plastic panel having a light-transmitting vacuum-deposited film on its inner surface.

In FIG. 6 a thin layer 73 of clear adhesive is applied over the transparent tin oxide electrode, or thin, transmissive deposited film 72. In the structure of FIG. 7, the transparent conductor 82 is applied on the curved glass panel 84 and covered by a clear adhesive film 83.

Figure 8:
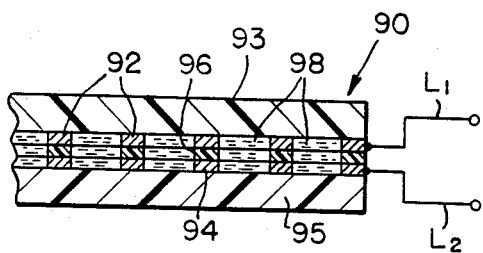

Still another modification of the invention is shown in FIG. 8. Here the cell 90 is composed of two screens 92, 94, each supported by a clear plastic substrate 93, 95, and facing one another. The screens are kept from short-circuiting against each other by a photoresist, which is an insulating film, overlying the screen area. This film can be shaped by exposing it to ultraviolet radiation, and then developing away the unexposed areas. The interstices of the resist insulating screen 96 are filled with NLC liquid crystal 98. A cell of this type would be used as an inexpensive electronic window shade.

Figure 9:
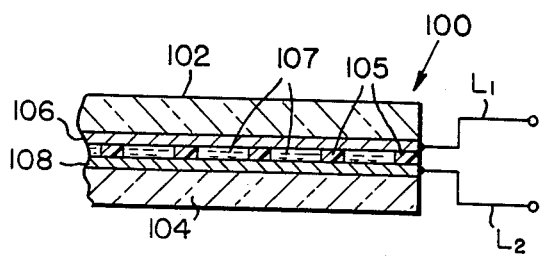

FIG. 9 depicts another light-transmissive cell 100 employing small plates 102, 104 of NESA glass, or large area sheets of clear plastic with light-transmissive conductive film 106, 108, respectively, on their inner opposing surfaces. Here again, the insulating dielectric 105 that separates the two electrodes 106, 108 is a photoresist layer, developed into a photoresist insulating screen. One, or both, conductive surfaces of the glass or plastic substrates are coated with the requisite thickness of a photoresist such as "KPR", "KMER", or "KOR" photosensitive gelatin emulsions. The resist is dried and then exposed to a negative of the screen patterrn. When developed, the resist will appear as an essentially transparent insulating screen on the surface of the conductive glass or plastic substrate. NLC material 107 is applied in the interstices at both insulating screens and the two transparent electrodes are brought together and secured by clamping or laminating. The two conductive plates will then be kept from short-circuiting against one another by the presence of the insulating photoresist screen.

Figure 10:
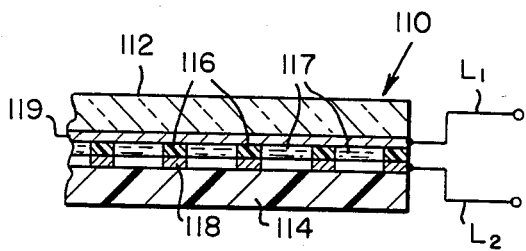
FIG. 10 is a fragmentary sectional view and FIG. 10A is a fragmentary plan view of a substrate made according to a still further modification of the invention in whihc both a which screen and a dielectric, non-light-transmissive screen are employed.
Figure 10A:
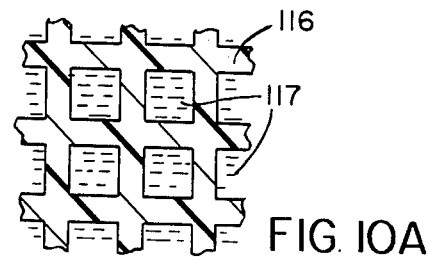

FIG. 10 illustrates another embodiment of the invention, in which the cell 110 comprises a clear glass overlay 112, a clear plastic substrate 114, a photoresist insulating screen 116, and a photoconductive screen 118. The inner surface of the clear glass overlay 112 is coated with a conductive tin oxide film 119. A conductive screen 118 is supported on the clear plastic substrate 114. The dielectric resist screen 116 may be formed as shown in FIG. 10-A. This screen 116 is non-light-transmissive; and its interstices are filled with the liquid crystal material 117.

Figure 11:
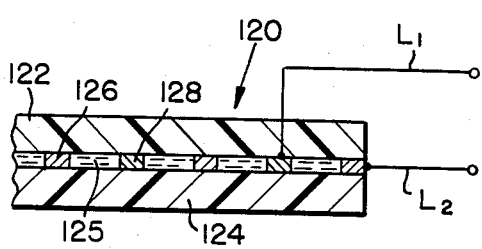
FIGS. 11 and 12 illustrate in section and diagrammatically, respectively, a modification of the invention in which the electrodes are comb-like in structure.
Figure 12:
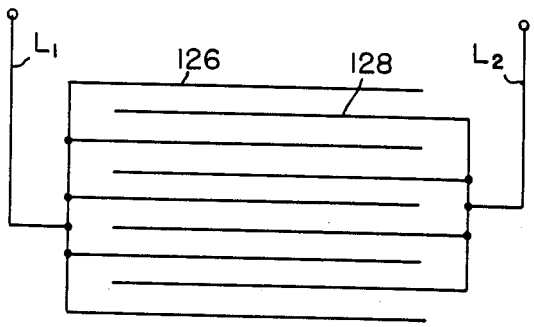

FIGS. 11 and 12 illustrate a further modification of the invention. The cell 120 shown in these FIGS. comprises a clear plastic overlay 122, and a transparent plastic or glass substrate 124. Here the electrodes 126, 128 are comb-like, interdigital members, and are coplanar and fixed to the same substrate 124. NLC material 125 is applied over the interdigital electrode structure and the clear plastic cover is laminated, enclosing the cell. Because of the difficulty in making designs in an interdigital electrode structure, such a cell structure is limited to use in devices such as light dimmers and electronic shades.

Figure 13:
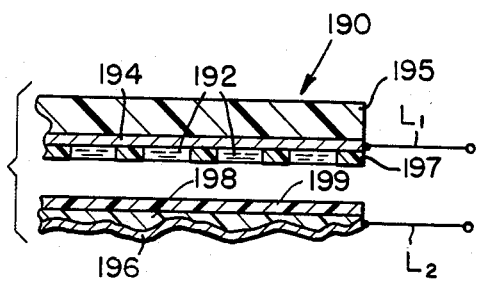
FIG. 13 shows a reflective sandwich-type cell made according to a further embodiment of this invention.

FIG. 13 shows a reflective sandwich-type NLC picture cell 190, in which the NLC material 192 is between the electrodes and 196. However, this sandwich-type NLC cell 190 is different from known sandwich-type cells in that the NLC material 192 contacts only one electrode 194, whereas in the known art the NLC material contacts both electrodes of a cell.

In the illustrated embodiment, the electrode that transmits the picture can be a light-transmissive, conductive film 194 on a glass substrate 195, or can be a vacuum deposited, light-transmissive coating on a clear plastic sheet. The cell 190 of this FIG. is composed of an insulating photoresist screen 197 mounted on the transparent conductive undercoating 194 of the glass or plastic viewing plate 195. The dielectric screen openings contain the NLC liquid crystal material 192 in a constant thickness and also restrain against sidewise squeeze-out. A thin dielectric film 199 covers a photo-formed or silk-screened dielectric image 198 which forms the display; and this is carried by a conductive film back electrode 196.

The insulating photoresist screen 197, however, can be applied directly against the glass plate 195 instead of, as shown, to the thin insulating film spacer 199. On the other side of this thin dielectric film spacer 199 is the dielectric photoresist image 198 of the picture or message to be generated.

Figure 14:
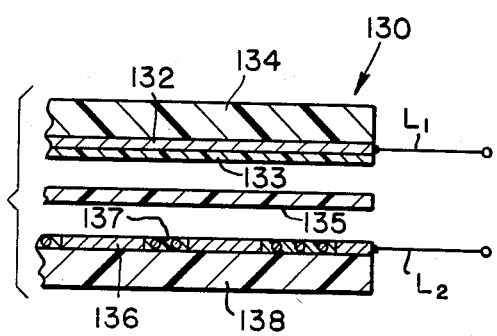
FIG. 14 is an exploded sectional view of a planar type cell made according to still another embodiment of the invention.

FIG. 14 is an exploded view showing a planar type NLC picture cell 130. Here the term "planar" is defined as having the liquid crystal material in the same plane as that of one of the exciting electrodes, as opposed to a sandwich-type cell where the NLC material is between the upper and lower electrodes. In the planar cell 130, the NLC material is activated by the fringe field rather than by a direct field as in a sandwich structure. In FIG. 14, there is a transparent conductive upper electrode in the form of a transmissive conductive coating 132 applied on the back face of a clear glass or plastic front covering sheet 134. An image of the picture is generated in a conductive screen back electrode on one face of a thin insulating film, or on the upper surface of the thicker supporting substrate 138 which can be clear or opaque depending upon whether the cell is of the transmissive or reflective type. A thin, transparent adhesive, or silicone grease 133 occupies the interface between the transparent conductive upper electrode 132 and one side of the thin insulating film 135. The NLC material 137 is contained in the interstices of the screen electrode 136.

Figure 15:
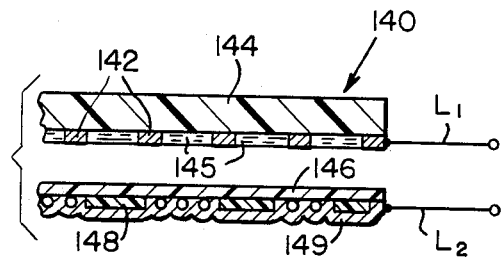
FIG. 15 is an exploded sectional view of another type of planar, reflective picture cell made according to the invention.

FIG. 15 shows another type of planar, reflective picture cell 140. The upper electrode 142 is in the form of a fine screen attached to the underside of a clear upper support sheet 144. A very thin dielectric film 146 is coated on its underside with an insulating half-tone photo-formed or silk-screened image. The dielectric image is then convered with a conductive film or coating 149 by spraying, for instance. The liquid crystal material 145 is then applied to the plane upper electrode screen 142, and then is joined with the thin dielectric substrate 146 which is coated with a thin conductive coating 149 forming a back electrode. The assembly is then laminated together between sealable plastic sheets.

Figure 16:
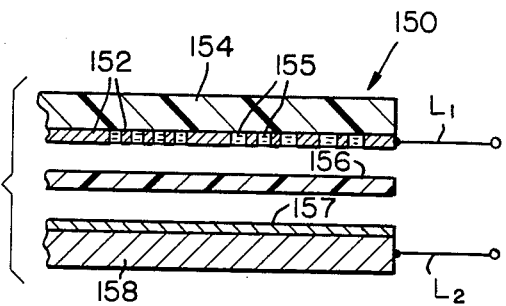
FIG. 16 is an exploded sectional view of still another type of planar picture cell.

FIG. 16 shows another type planar NLC picture cell 150. The upper electrode 152 is made in the form of the image attached to, or etched on, the back of the upper clear insulating support 154. A thin dielectric film spacer 156 is placed between the image electrode 152 containing the NLC material 155, and a lower metal foil, back electrode 158. A thin conductive adhesive layer 157 is interposed between the back electrode 158 and the underside of the thin dielectric film 156 to exclude air and to achieve uniform contact.

A sprayed-on conductive coating may be applied over the dielectric, photoformed image to function as the back electrode in place of the metal foil, if desired.

Since the degree of NLC turbulence or dynamic scattering is proportional to the strength of the electrostatic field traversing the NLC material, the dielectric photoresist image, being thicker and thinner in different spots will thereby cause variations in the field strength across the material in accordance with the details of the photoresist image. Instead of applying a photoresist image, the picture or pattern on the insulating film spacer may be applied by means of silk-screening, which is also sprayed with a conductive coating to achieve the desired variation in field across the NLC material.

X-Y type liquid crystal matrices can also be fabricated according to the present invention for use in dynamic plotting screens, vertical or horizontal stock quotation boards, airport arrival and departure displays, outdoor scoreboards, etc.

Figure 17:
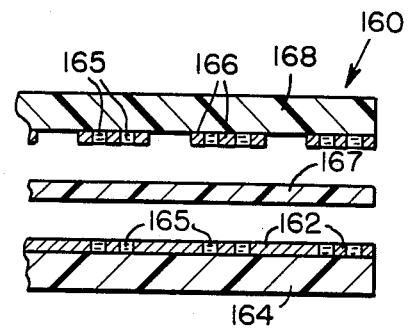
FIG. 17 is an exploded cross-sectional view of an X-Y matrix made according to a still further embodiment of this invention.
Figure 19:
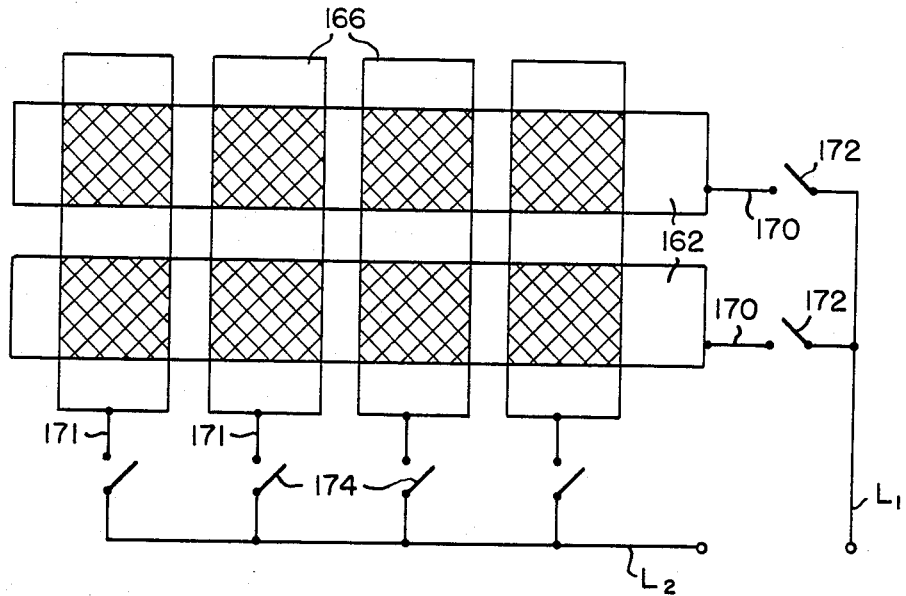
FIG. 19 is a diagrammatic view showing an X-Y array of screen electrodes.

FIG. 17 is a cross-sectional view of the X-Y matrix of FIG. 19. This X-Y matrix 160 is composed of a set of parallel row, screen electrodes 162 on one clear insulating substrate 164, constituting the X axis substrate, and a set of parallel columnar Y axis electrodes 166 on another clear insulating substrate 168. The NLC material 165 is applied to the screen electrodes 162 and 166 on both the X and Y substrates. The cell 160 is completed with the addition of a thin clear dielectric film 167 placed between the X and Y substrates in contact with the NLC material of both substrates.

As shown in FIG. 19, the X-Y screen electrodes are assembled so that they are orthogonal. Contact is made to the screen electrodes 162, 166 through terminals 170, 171 along the ends of the substrate. Switches 172, 174 close the circuits to the main lines $L_1$ and $L_2$.

Figure 18:
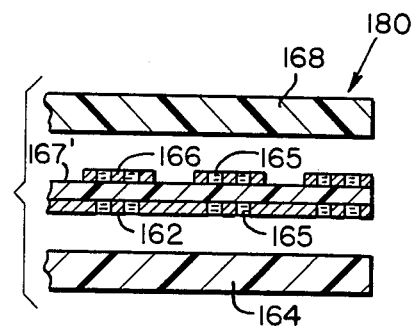
FIG. 18 is an exploded cross-sectional view of a modified X-Y matrix structure.

In FIG. 18, the X-Y screen electrodes are spaced from one another but the thin dielectric film 167' is in this case the substrate for the X and Y screen electrodes 162 and 166 whereas in FIGS. 17 and 19 the X-Y screen electrodes are applied to clear substrates with the thin dielectric spacer film in between. The unit 180 of FIG. 18, however, will produce the same result as the unit of FIGS. 17 and 19. The clear thicker insulating substrates 168 and 164 in contact with the top and bottom of the thin dielectric film are used to stiffen the assembly. As in FIGS. 17 and 19 the NLC material 165 is applied to each X and Y screen.

FIG. 19 shows an X-Y array of screen electrodes. The electrodes can be applied to the clear outer substrates as in FIG. 17, or they can be applied to the thin dielectric film as shown in FIG. 18. By selecting an X-Y coordinate and applying an alternating voltage, the NLC material at the cross point will become turbulent and will scatter ambient light. If the X-Y coordinates are selected successively fast enough, that is, within the time constant of the liquid crystal system, a dynamic pattern can be generated at a rate determined by the temperature of the material, the applied voltage, and the activation-relaxation times of the material.

The X-Y matrix of FIG. 19 can be either transmissive or reflective, since the X and Y cell elements are screens and thus are transmissive. For reflection only, one set of electrodes is made solid.

Figure 20:
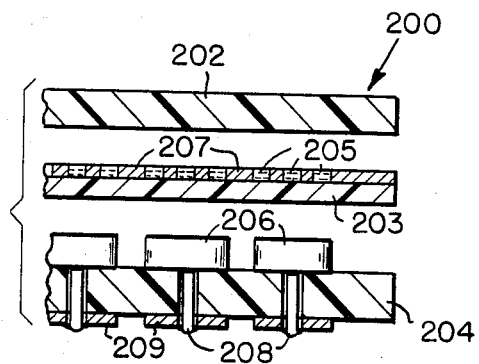
FIG. 20 shows a cross-section, on the line 20—20 of FIG. 22, of an embodiment of the invention in which a printed circuit substrate is employed in conjunction with an X-Y structure.

In order to prevent "cross-effect", that is, the activation at one-half the applied voltage of the unselected cells, a reflective X-Y display panel 200, such as shown in cross-section in FIG. 20, with non-linear elements in series with each X-Y liquid crystal cell element, may be employed.

This unit comprises a clear glass or plastic cover 202, a printed circuit substrate 204, with non-linear screen-type pellets 206 connected through contact pins 208 with the Y column electrodes 209, a dielectric spacer 203, a screen X-axis, electrode 207 on the spacer, and NLC liquid crystals 205 in the interstices of the screen electrodes. Here the reflective X-Y display panel has the non-linear elements 206 in series with each X-Y crystal cell element as shown in FIG. 22.

Figure 23:
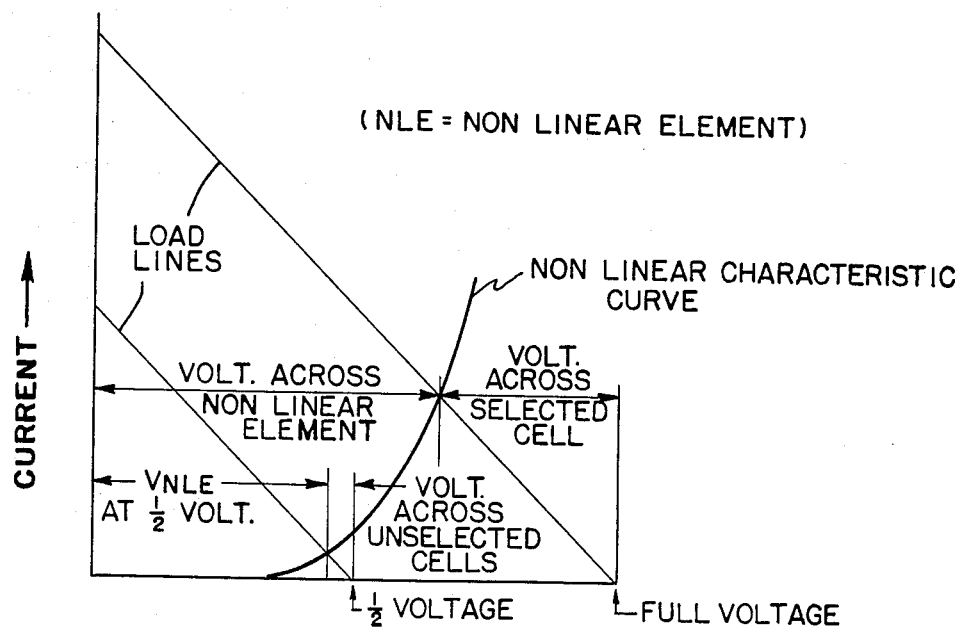
FIG. 23 is a diagram illustrating the operation of this unit.

FIG. 23 shows how this unit operates. From this FIG. it can be seen that when the selected X-Y coordinate NLC cell and its associated non-linear element (NLE) 206 has full voltage applied across them through closing of the required switches 215, the unselected NLC cells and their associated non-linear elements will be at one-half the voltage which appears across the selected cell. The net result is that only a small fraction of the applied voltage will appear across all the unselected cells, while a very large fraction of the applied voltage will be present to excite the selected cells.

Figure 21:
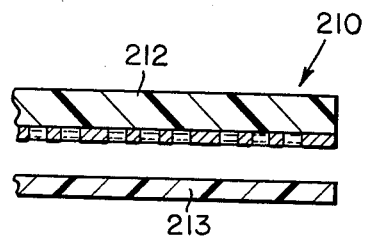
FIG. 21 is a fragmentary cross-sectional view similar to FIG. 20 but showing the X axis screen electrodes attached to a thick insulating substrate instead of to a thin dielectric film.

FIG. 21 shows a cross-section of a reflective X-Y matrix panel 210 which is similar to that shown in FIG. 20 except that the X-axis screen electrodes are attached to a clear, thick insulating substrate 212 rather than being attached to the thin dielectric film 213.

Figure 22:
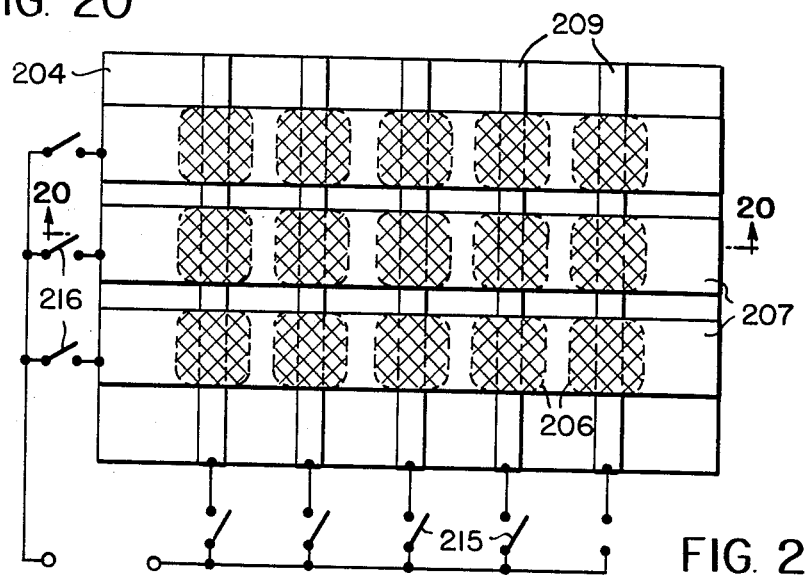
FIG. 22 is a diagrammatic plan view further showing the X-Y structure illustrated in FIG. 20.

FIG. 22 is a plan view of a reflective liquid crystal X-Y matrix panel. It is seen that there is only one set of parallel screen electrodes along the X axis. The solid Y axis electrodes 209 are fabricated on a printed circuit board and connect to the pin terminals on the bottoms of the NLC shown in FIG. 20. The electrodes are energized by closing selectively switches 215 and 216. When an alternating current voltage is applied to a selected X-Y coordinate only that point will be activated due to the suppression of the cross effect by the non-linear pellets in series with each cell of the matrix. The NLC crystal material is in the screen openings of the non-linear pellets. The screen electrodes are in the X-axis; and the Y-axis is formed by the column of electrodes on the printed circuit.

While the invention has been described in connection with several different embodiments thereof, it will be understood that is is capable of further modification; and this application is intended to cover any modifications of the invention which come within the disclosure, the scope of the invention, or the limits of the appended claims.

Having thus described my invention, what I claim is:
1. A display comprising
   first and second electrodes disposed in spaced, parallel planes, said first electrode being an electrically-conductive foraminate screen having its interstices filled with a liquid crystal material which is normally transparent but which becomes turbulent in the presence of an electrostatic field,
   a layer of dielectric material positioned between the confronting surfaces of said screen and said second electrode, and
   a transparent plate covering one of said electrodes at the side thereof opposite to said dielectric layer.
2. A display as claimed in claim 1, wherein said layer of dielectric material separates both said screen and said liquid crystal material from said second electrode.
3. A display as claimed in claim 1, wherein the layer of dielectric material is an insulating screen registering with the first-named screen.
4. A display as claimed in claim 1 wherein both electrodes are electrically-conductive foraminate screens, and the interstices of both screens contain said liquid crystal material.
5. A display as claimed in claim 4, wherein the transparent plate covering said one electrode is a clear, dielectric, and wherein the other electrode is also covered by a clear dielectric substrate.
6. A display as claimed in claim 4, wherein said layer of dielectric material is a transparent film.
7. A display as claimed in claim 1, wherein said second electrode is a transparent electrically conductive film, the covering plate is glass, and the layer of dielectric material is a transparent dielectric film.
8. A display as claimed in claim 1, wherein the transparent plate is glass, said second electrode is a transparent conductor adhered to the underside of the glass by a clear adhesive film, said layer of dielectric material is a transparent film, and said first electrode is mounted on a clear plastic substrate.
9. A display as claimed in claim 8, wherein the glass, transparent conductor, dielectric film, said first electrode, and said plastic substrate are all curved and of identical curvature.

10. A display as claimed in claim 3 wherein both electrodes, are electrically-conductive foraminate screens and the insulating screen is disposed between them and registers with both electrodes.

11. A display comprising
three superposed layers of material, the two outer layers being made of electrically-conductive material and defining two spaced electrodes, and the inner layer being made of dielectric material and electrically insulating said two electrodes from each other,
one of said layers being a foraminate grid having its interstices filled with a liquid crystal material which is normally transparent, but which becomes turbulent when an electric potential is applied across said electrodes, and
a transparent cover plate overlying one of said electrodes on the side thereof remote from said insulating layer,
said grid being electrically conductive and mounted on a substrate plate and constituting one electrode of the display, and
the other electrode being an electrically conductive coating on the underside of said cover plate.

12. A display as claimed in claim 11, wherein the substrate plate is transparent.

13. A display as claimed in claim 11, wherein the substrate plate is opaque.

14. A display comprising
three superposed layers of material, the two outer layers being made of electrically-conductive material and defining two spaced electrodes, and the inner layer being made of dielectric material and electrically insulating said two electrodes from each other,
one of said layers being a foraminate grid having its interstices filled with a liquid crystal material which is normally transparent, but which becomes turbulent when an electric potential is applied across said electrodes, and
a transparent cover plate overlying one of said electrodes on the side thereof remote from said insulating layer,
said grid being electrically-conductive and seated against said transparent plate to form one of said electrodes, the other electrode being a metal foil electrode on which is disposed an adhesive layer, and said dielectric inner layer being interposed between said grid and said adhesive layer.

15. A display comprising
three superposed layers of material, the two outer layers being made of electrically-conductive material and defining two spaced electrodes, and the inner layer being made of dielectric material and electrically insulating said two electrodes from each other,
one of said layers being a foraminate grid having its interstices filled with a liquid crystal material which is normally transparent, but which becomes turbulent when an electric potential is applied across said electrodes, and
a transparent cover plate overlying one of said electrodes on the side thereof remote from said insulating layer
there being a plurality of said grids seated against said transparent plate and extending in one direction in parallelism to one another,
a second transparent plate being provided,
a second plurality of said grids being seated one said second plate and extending in parallelism to one another but at right angles to the first-named plurality of grids to provide and X-Y panel,
said dielectric layer being disposed between said first and second pluralities of grids, and all said grids being electrically-conductive, and
means for applying an electric current selectively to any one of said first-named plurality of grids and simultaneously selectively to any one of the second plurality of grids.

* * * * *